United States Patent
Jansma

(10) Patent No.: US 6,531,814 B1
(45) Date of Patent: Mar. 11, 2003

(54) FLUORESCENT LAMP COATING AND COATING RECYCLING METHOD

(75) Inventor: Jon B. Jansma, Pepper Pike, OH (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/502,244

(22) Filed: Feb. 17, 2000

(51) Int. Cl.⁷ .................................. H01J 31/00
(52) U.S. Cl. .................. 313/479; 313/485; 313/468; 313/480; 427/345
(58) Field of Search .................. 313/485, 486, 313/487, 468, 635, 479, 480; 427/230, 345; 209/21, 30

(56) References Cited

U.S. PATENT DOCUMENTS

| | | |
|---|---|---|
| 3,833,398 A | 9/1974 | Schreurs |
| 3,937,998 A | 2/1976 | Verstegen et al. |
| 4,088,923 A | 5/1978 | Manders |
| 4,335,330 A | 6/1982 | Peters et al. |
| 4,431,941 A | 2/1984 | Roy et al. |
| 4,597,984 A | 7/1986 | Jansma |
| 4,806,824 A | 2/1989 | Paynter et al. |
| 4,847,533 A | 7/1989 | Hoffman |
| 5,045,752 A | 9/1991 | Jansma |
| 5,258,689 A | 11/1993 | Jansma et al. |
| 5,539,277 A | 7/1996 | Jansma |
| 5,602,444 A | 2/1997 | Jansma |
| 5,726,528 A | 3/1998 | Jansma et al. |
| 5,821,682 A | 10/1998 | Foust et al. |
| 5,838,100 A | 11/1998 | Jansma |
| 6,004,686 A | 12/1999 | Rasmussen et al. |

FOREIGN PATENT DOCUMENTS

| | | |
|---|---|---|
| DE | 235 075 A | 4/1986 |
| DE | 44 35 365 A | 3/1996 |
| EP | 0 157 249 A | 10/1985 |
| EP | 0 391 382 A | 10/1990 |

Primary Examiner—Sandra O'Shea
Assistant Examiner—Guiyoung Lee
(74) Attorney, Agent, or Firm—Fay, Sharpe, Fagan, Minnich & McKee, LLP

(57) ABSTRACT

A process for recovering rare-earth phosphors from an interior of a lamp envelope (12). The interior of the envelope defines a wall and a base layer (14) is adhered to the wall. A coating layer (16) having the rare-earth phosphors is adhered to the base layer. The process includes flowing a gas through the envelope at a rate sufficient to remove particles of the coating layer but not the base layer. The process also includes collecting the particles of the coating layer, the particles containing the rare-earth phosphors. Lamp envelopes (12) having a base layer (14) and a phosphor coating layer (16) suitable for use with the recycling method are also discussed.

23 Claims, 2 Drawing Sheets

FLUORESCENT LAMP COATING AND COATING RECYCLING METHOD

BACKGROUND OF THE INVENTION

1. Field of the Invention

The present invention generally relates to fluorescent lamps and, more particularly, to fluorescent lamps which have coating layers compatible with a recycling method.

2. Discussion of the Art

Fluorescent lamps typically contain a phosphor layer, containing rare-earth phosphors, and a base, or barrier, layer. The base layer, typically made of alumina or halophosphor, is applied between the phosphor layer and a glass tube. Presently, there are two types of recycling processes used to reclaim the materials contained in the phosphor layer and the base layer. The first process, also referred to as crush and sift, involves crushing a fluorescent lamp into relatively small pieces and separating the pieces by sifting. The materials contained in the phosphor layer and the base layer can be collected in powder form. The second process involves removing the ends of the lamp by cutting. Then the phosphor layer and the base layer are simultaneously removed by directing a stream of air through the tube. The components of the phosphor layer and the base layer are blown out of the tube in powder form and are collected in a collection chamber. In either method, the rare-earth phosphors and the base layer components are combined. The base layer components then need to be removed from the rare earth phosphor components in order to reuse the rare earth phosphor components in lamp products with an acceptable light output performance. Separation of halophosphor, alumina and rare earth phosphors is difficult due to the similar physical properties and particle size of the materials. No readily available methods are known to sufficiently separate the rare earth phosphors from the other materials. Therefore, there is a need in the art for a fluorescent lamp from which the rare earth phosphors of the phosphor layer may be independently recovered.

BRIEF SUMMARY OF THE INVENTION

It is therefore seen to be desirable to provide a process for recovering rare-earth phosphors from the interior of a lamp envelope. The interior of the envelope defines a wall and a base layer is adhered to the wall. A coating layer containing the rare-earth phosphors is adhered to the base layer. The process includes flowing a gas through the envelope at a rate sufficient to remove particles of the coating layer but not the base layer. The process also includes collecting the particles of the coating layer, the particles containing the rare-earth phosphors.

In accordance with one embodiment of the present invention, an envelope for a discharge lamp includes a light-transmissive substrate having an inner surface. A base layer is coated on the inner surface of the envelope, the base layer comprising a blend of alumina particles, the alumina blend having 5 to 80 weight percent gamma alumina with a median particle size in the range of 30 to 100 nm and 20 to 95 weight percent alpha alumina with a median particle size in the range of 500 to 1500 nm. The base layer is applied in a suspension, the suspension containing the alumina particles and surfacting, dispersing and thickening agents, the suspension being 0.01 to 5 weight percent surfacting agent. A phosphor layer is coated on an inside surface of the base layer, the phosphor layer comprising a rare-earth phosphor blend.

DETAILED DESCRIPTION OF THE INVENTION

Figure 1:
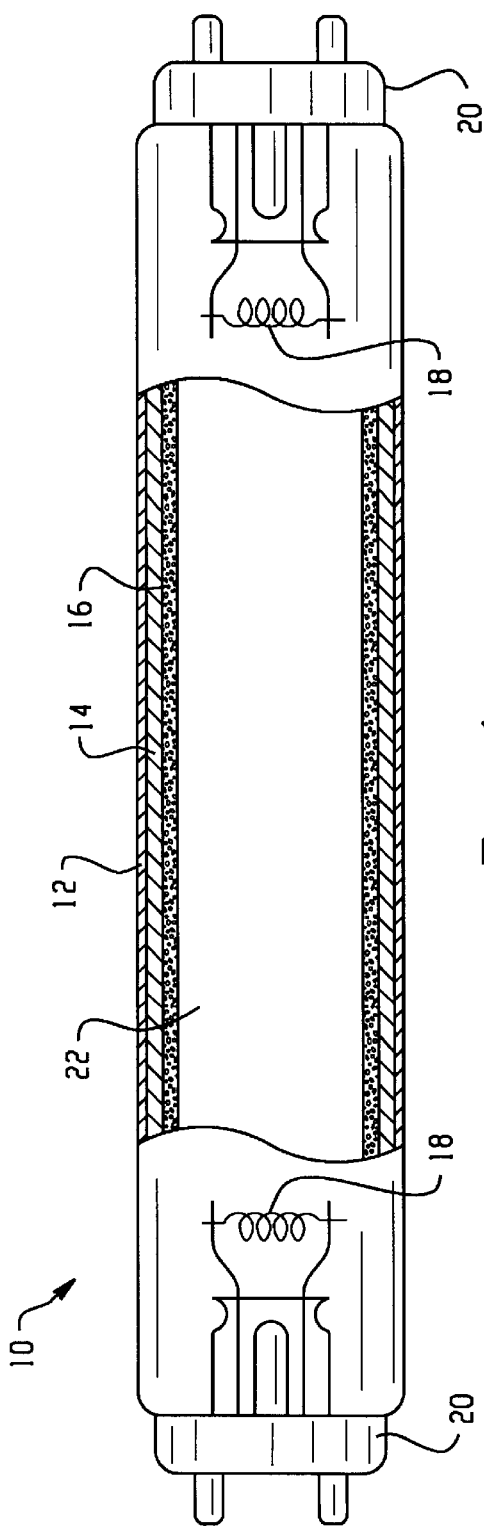
FIG. 1 shows diagrammatically, and partially in section, a fluorescent lamp according to the present invention.

FIG. 1 shows a representative low pressure gas discharge fluorescent lamp 10, which is generally well-known in the art. Sometimes such lamps are referred to generally as mercury vapor lamps. The lamp 10 has a light transmissive glass tube or envelope 12 which has a circular cross-section. The inner surface of the glass tube is provided with an ultraviolet reflecting barrier layer, or base layer 14. The inner surface of the base layer 14 is provided with a coating layer, or phosphor layer 16, the base layer 14 being between the envelope 12 and the phosphor layer 16.

The lamp 10 is hermetically sealed by bases 20 attached at both ends of the envelope 12. Electrode structures 18 to provide an arc discharge are respectively mounted on the bases 20. A discharge-sustaining fill gas 22 is provided inside the sealed glass tube, the fill gas 22 being typically an inert gas such as argon or a mixture of argon and other noble gases at a low pressure to provide the low vapor pressure manner of lamp operation.

The layers 14, 16 are utilized in a low pressure mercury vapor lamp, but may also be used in high pressure mercury vapor discharge lamps. The layers 14, 16 may be used in fluorescent lamps having electrodes as are known in the art, as well as in electrodeless fluorescent lamps as are known in the art, where the discharge producing mechanism is provided by a high frequency electromagnetic energy or radiation.

As will be described in more detail below, the base layer 14 and the phosphor layer 16 have been formulated to be recyclable in a convenient manner. Briefly, the recycling process involves cutting the bases 20 off of the envelope 12, resulting in the coated cylindrical tube illustrated in FIG. 2. Next, air is directed through the glass tube at a first velocity to remove the phosphor layer 16 as illustrated in FIG. 3. Optionally, a second stream of air is directed through the tube at a second velocity, the second velocity being greater than the first velocity, to remove the base layer 14 as illustrated in FIG. 4. By separately removing the base layer 14 and the phosphor layer 16, the materials collected from the layers 14, 16 can be reused in new lamps. For compatibility with the foregoing recycling method, the formulation of the phosphor layer 16 has less cohesion and adhesion than the base layer 14. In other words, the formulation of the base layer 14 adheres to the envelope 12 with more adhesion than the particles of the phosphor layer 16 adheres to the base layer 14. In addition, the particles of base layer 14 have more cohesion with other particles of the base layer 14 than the cohesion between the particles of the phosphor layer 16.

The base layer 14 will now be discussed in detail. The base layer 14 is similar to the barrier layer discussed in co-owned U.S. Pat. No. 5,602,444 to Jansma. The base layer 14 is or contains a blend of gamma alumina particles and alpha alumina particles. The gamma alumina particles have a median particle size (diameter) in one embodiment of 1 to 500 nm, in one embodiment 20 to 200 nm, in one embodiment 30 to 100 nm, and in one embodiment 50 nm. The alpha alumina particles have a median particle size (diameter) in one embodiment of 50 to 5,000 nm, 100 to 2,000 nm, in one embodiment 500 to 1,500 nm, and in one embodiment of about 1,000 nm.

The alumina particle blend in the base layer 14 in one embodiment is 5 to 80, in one embodiment 10 to 65, and in one embodiment 20 to 40, in one embodiment 25 to 35, and in one embodiment about 30, weight percent gamma alumina, and in one embodiment 20 to 95, in one embodiment 35 to 90, in one embodiment 60 to 80, in one embodiment 65 to 75, and in one embodiment about 70, weight percent alpha alumina.

The base layer 14 is provided on the lamp 10 as follows. The gamma alumina and alpha alumina particles or powders are blended by weight. The particles should be substantially pure or of high purity substantially without light-absorbing impurities or with a minimum of light-absorbing impurities. The alumina is then dispersed in a water vehicle with surfacting, dispersing and thickening agents. The surfactant, dispersant and thickener, which will be discussed in greater detail below, are selected to help the alumina particles evenly coat the interior of the envelope 12 and provide sufficient adhesion to resist being blown off the envelope 12 when the first stream of air is directed through the envelope to remove the phosphor layer 16. The resulting suspension being about 5 to 15 weight percent alumina.

The suspension is then applied as a coating to the inside of the glass tube and heated, as is known in the art. In the heating stage, also referred to as lehring, the non-alumina components are driven off, leaving only the alumina behind. The base layer 14 is applied so that the weight of the alumina in the coating, or base layer 14 (the "coating weight") in one embodiment is 0.1 to 3, in one embodiment 0.3 to 1, in one embodiment 0.5 to 0.7, and in one embodiment about 0.6, mg of alumina per $cm^2$.

The foregoing particle sizes for the gamma and alpha alumina particles are selected to density the base layer 10 and thereby provide higher cohesion and adhesion than the phosphor layer 16. The surfactant is used to help evenly spread the base layer 14 to minimize flocculation of the alumina particles so that the alumina particles dry in a tight packed and dense arrangement and to minimize the appearance of voids between the particles. The surfactant acts at the air-liquid interface as a wetting agent to control the surface tension of the suspension. The surfactant is a non-ionic agent such as nonyl phenyl ethoxylate surfactant which is available under the trade name IGEPAL from Sigma-Aldrich located at 3050 Spruce Street, St. Louis, Mo. 63103. The resulting suspension in one embodiment is 0.01 to 5, in one embodiment 0.03 to 3, and in one embodiment 0.05 to 2, weight percent surfacting agent. Example alternative surfactants include: polyethylene oxide/polypropylene oxide block copolymers available from BASF under the designation PLURONICS or from PPG under the designation MAKOL; alcohol ethoxylates available from ICI under the designation TRITON; and ethoxylated acetylenic diols available from Air Products under the designations SURFYNOL and DYNOL.

The dispersant also acts to evenly spread the alumina particles and minimize their flocculation. The dispersant is an anionic polyelectrolyte preferably based on acrylic acid such as ammonium polyacrylate or another dispersing agent known in the art can be used. The suspension containing the anionic polyelectrolyte dispersant in one embodiment is 0.01 to 5, in one embodiment 0.03 to 3, and in one embodiment 0.05 to 2, weight percent dispersing agent. Example alternative dispersants include ammonium salts of polymethacrylic acid and ammonium hexametaphosphate.

The thickener is a random copolymer used to control the viscosity of the coating and the rheological behavior. The thickener is chosen to be compatible with the surfactant, the dispersant and the alumina. A suitable acrylic thickener is available from Allied Colloids Group PLC located at Cleckheaton Road, Low Moor, Bradford BD12 0JZ, England under the designation KA-21. The suspension in one embodiment is 0.05 to 20 and in one embodiment 1 to 10, weight percent thickening agent. Example alternative thickeners include: ammonium salt of a random copolymer of methacrylic acid and ethylacrylate available from Allied Colloids under the designation KA-21 or from Vulcan under the designation VULCASTAB-T; alternating copolymer of vinyl methylether with malaic anhydride available from Rhodia under the designation GANTREZ AN169; and polyacrylamide available from Dow Chemical under the designation SEPRAN.

The base coat 14 when dried is substantially insoluble in water. Otherwise, when the phosphor layer 16 is applied in an aqueous solution, the base layer 14 will swell and wash off. It has been found that the foregoing combination of acrylate and alumina works well to achieve a high degree of insolubility. As an alternative, the base coat 14 can be a halophosphor coating having aluminum oxide blended with the halophosphor to achieve this substantially insoluble behavior.

Turning to the phosphor layer 16, the phosphor layer 16 contains phosphor particles, such as a relatively inexpensive phosphor which emits a white light, such as a calcium halophosphate activated with antimony and manganese, or alternatively another halophosphate phosphor as known in the art. However, it is preferred that the phosphor layer 16 contains a rare earth phosphor system, which is typically a blend of rare earth phosphors. As used herein a rare earth phosphor system includes (1) a tri-phosphor system such as a red, blue and green color-emitting phosphor blend as disclosed in U.S. Pat. Nos. 5,045,752; 4,088,923; 4,335,330; 4,847,533; 4,806,824; 3,937,998 and 4,431,941; and (2) phosphor blends which have other members of rare earth phosphors, such as a system with 4 or 5 rare earth phosphors. For a more detailed discussion of such rare earth phosphor system attention is directed to co-owned U.S. Pat. No. 5,838,100 to Jansma.

The phosphor layer 16 in one embodiment is 30 to 100, in one embodiment 40 to 70, in one embodiment 45 to 75, in one embodiment 60 to 70, and in one embodiment about 66⅔, weight percent phosphor. The phosphor is preferably a triphosphor blend such as a rare earth triphosphor blend, also referred to as a rare earth triphosphor.

The phosphor layer 16 optionally contains alumina. If the phosphor layer 16 does contain alumina, it contains in one embodiment at least 20, in one embodiment at least 25, in one embodiment at least 30, weight percent alumina. In one embodiment, the phosphor layer 16 contains 20 to 70, in one embodiment 30 to 60, in one embodiment 25 to 55, in one embodiment 30 to 40, and in one embodiment 33⅓, weight percent alumina. The alumina in one embodiment is 0 to 50, in one embodiment at least 5, in one embodiment at least 10, in one embodiment 10 to 50, in one embodiment 10 to 45, in one embodiment 25 to 40, in one embodiment about 30, weight percent gamma alumina and in one embodiment 50 to 100, in one embodiment 55 to 90, in one embodiment 60 to 75, in one embodiment about 70, weight percent alpha alumina. The gamma alumina has a particle size (diameter) of in one embodiment 10 to 500, in one embodiment 30 to 200, in one embodiment 50 to 100, nm. The alpha alumina has a particle size (diameter) of in one embodiment 50 to 5,000, in one embodiment 100 to 2,000, in one embodiment 500 to 1,000, in one embodiment about 700, nm. The alumina should be substantially pure, such as 99.99% pure or of high purity substantially without light-absorbing impurities or a minimum of light-absorbing impurities. The phosphor layer 16 is free or substantially free from the presence of silica.

The phosphor layer 16 is provided on the lamp as follows. The phosphor particles or powders are blended by weight with the gamma alumina and alpha alumina particles. The resulting powder is then dispersed in a water vehicle with a dispersing agent, a surfacting agent, and a thickening agent. The suspension is then applied as a coating to the inside of the base layer 14 and heated as is known in the art. In the heating stage, the components other than alumina and phosphor are driven off, leaving only alumina and phosphor behind. The phosphor layer 16 is applied so that the weight of the phosphor in the layer (the "coating weight") is in one embodiment 0.5 to 3, in one embodiment 0.8 to 2, and in one embodiment 1 to 1.2, mg of phosphor per cm$^2$. The lamp contains sufficient phosphor to meet a desired lumen rating, for example a 2,950 or 2,850 lumen rating. The coating weight of powder or solids (alumina and phosphor combined) is in one embodiment 0.75 to 4.5, in one embodiment 1.2 to 3, and in one embodiment 1.5 to 1.8, mg/cm$^2$.

The addition of alumina in the phosphor layer 16 is typically used in a single-coated lamp. Therefore, the presence of alumina in the phosphor layer 16 is strictly optional in the double-coated lamp of the present invention. The resulting suspension is about 5 to 20 weight percent powder (phosphor and optionally alumina).

The dispersant, surfacting agent and thickening agent are non-ionic additives. Since there is no third layer deposited on the phosphor layer 16, the solubility concerns of the base layer 14 are not present with respect to the phosphor layer 16. Accordingly, there is more flexibility in the formulation of the phosphor layer 16 and the fact that soluble phosphor is present is of minimal consequence.

The dispersing agent and the surfacting agent in the phosphor layer 16 perform the same functions. Therefore, the dispersing agent and the surfacting agent are selected from various non-ionic compounds such as polyethylene oxide, polypropylene oxide and copolymers. An exemplary dispersing agent or surfacting agent is available from BASF located in Mt. Olive, N.J. and sold under the trade designation PLURONICS. The suspension in one embodiment is 0.1 to 3 weight percent dispersing agent. The suspension in one embodiment is 0.05 to 0.3 weight percent surfacting agent. Example alternative surfactants include: polyethylene oxide/polypropylene oxide block copolymers available from BASF under the designation PLURONICS or from PPG under the designation MAKOL; alcohol ethoxylates available from ICI under the designation TRITON; and ethoxylated acetylenic diols available from Air Products under the designations SURFYNOL and DYNOL.

The thickening agent is typically polyethylene oxide or another thickening agent as is known in the art. The thickening agent is available from Union Carbide Corporation located at 39 Old Ridgebury Road, Danbury, Conn. 06817 under the trade designation POLYOX. The suspension in one embodiment is 1 to 5 weight percent thickening agent. Example alternative non-ionic thickeners include: polyethylene oxide available from Mesai under the designation ALKOX, polyvinyl alcohol available from Air Products under the designation AIRVOL, hydroxyethylcellulose available from Hercules under the designation KLUCEL, and polyvinlypyrrolidone available from BASF.

Figure 2:
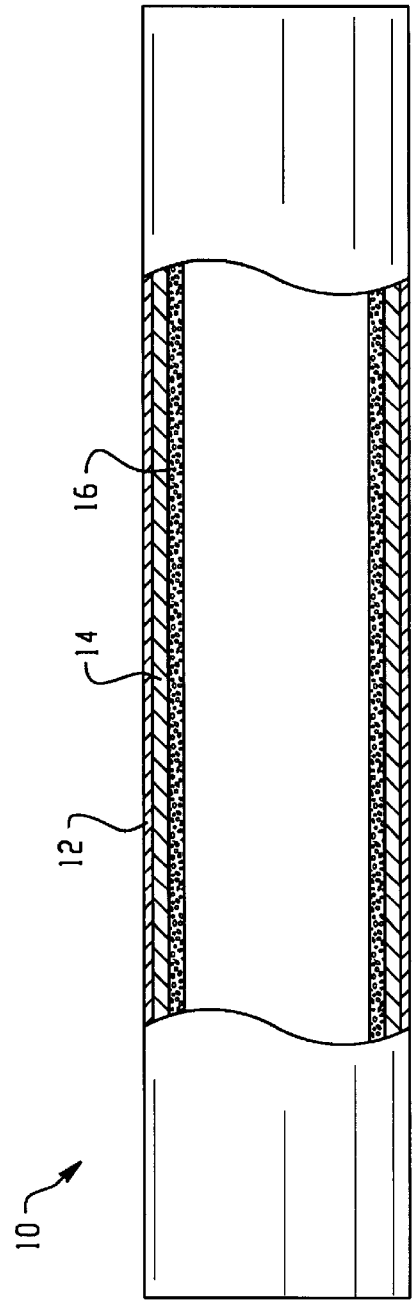
FIGS. 2 through 4 show diagrammatically, and partially in section, a fluorescent lamp in intermediate steps of recycling according to a method of the present invention.
Figure 3:
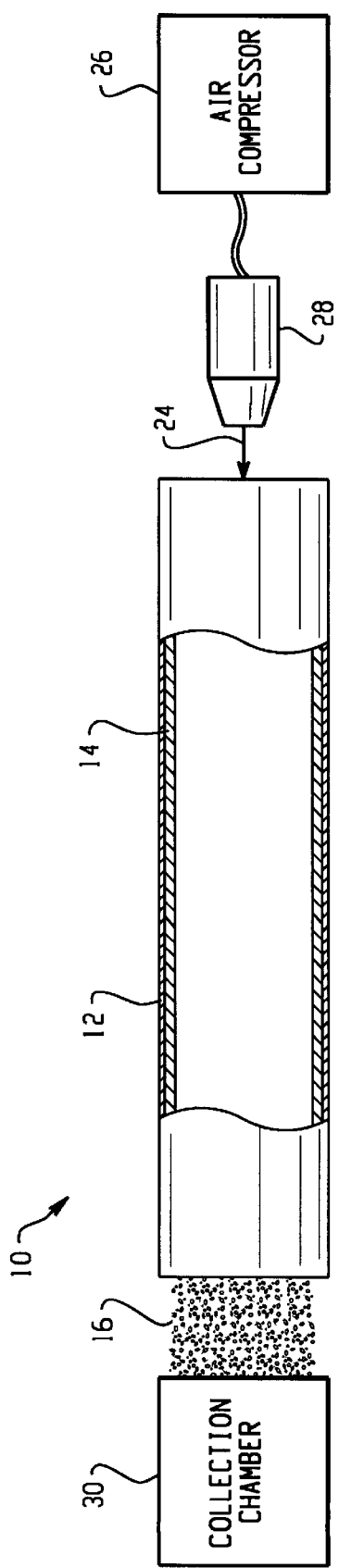
Figure 4:
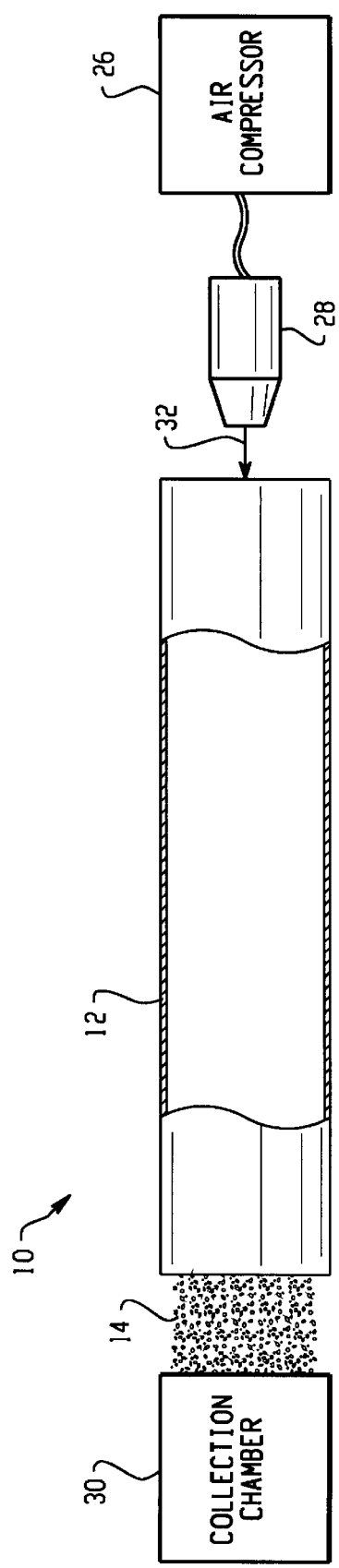

Referring now to FIGS. 2 through 4, the recycling method according to an exemplary embodiment of the present invention will be described in detail. First, at least the bases 20 and the attached electrode structures 18 are removed. This can be accomplished using an end-cut technique as is known in the art. FIG. 2 illustrates the lamp after the ends have been cut and removed. The lamp 10 now has the glass envelope 12, the base layer 14 and the phosphor layer 16. The discharge-sustaining fill gas 22 is recovered using known techniques.

With reference to FIG. 3, a first stream of air 24, or other gas, is directed through the envelope 12. The first stream of gas 24 is pressurized using an air compressor 26 and is expelled from the air compressor 26 using a nozzle 28. As the first stream of air 24 passes through the envelope 12 the air tends to dislodge the particles contained in the phosphor layer 16 and blows the particles out of the opposite end of the envelope 12. The particles from the phosphor layer 16 are then collected in a collection chamber 30. The collection chamber 30 is a powder or aerosol collecting system as is well known in the art. Typically these collection systems have a large chamber in which the particles settle. A dust filtration system is provided to collect any overflow particles. Alternatively, the particles can be collected using a cyclonic air/particle separator. As illustrated in FIG. 3, after the first stream of air 24 has removed all or almost all of the phosphor layer 16 the lamp 10 now has the envelope 12 coated with the base layer 14.

Referring to FIG. 4, the base layer 14 is optionally removed by a second stream of air 32, or other gas, in the same manner that the phosphor layer 16 is removed by the first stream of air 24. If recovery of the material in the base layer 14 is not desired the step of blowing a second stream of air 32 through the envelope 12 is not conducted. The first stream of air 24 has a velocity which is slower than the velocity of the second stream of air 32. The slower first stream of air 24 is selected to have a velocity fast enough to remove the particles of the phosphor layer 16 but is slow enough so as to minimize removal of the particles from the base layer 14. The first stream of air 24 has a velocity in the range of 10 to 40 meters per second and a volumetric flow in the range of 0.2 to 10 liters per second. The first stream of air 24 has a temperature in the range of 10° to 50° Celsius.

As one skilled in the art will appreciate, the lamp 10 fabricated with the base layer 14 and the phosphor layer 16 as described above can be recycled using the method described above with a high recovery rate of the materials from the phosphor layer 16 separate from the materials of the base layer 14. Since the layers are recovered separately, the recovered materials are ready for use in a new lamp with little or no processing to separate rare earth phosphor particles from alumina particles.

Although particular embodiments of the invention have been described in detail, it is understood that the invention is not limited correspondingly in scope, but includes all changes, modifications and equivalents coming within the spirit and terms of the claims appended hereto.

What is claimed is:

1. A process for recovering rare-earth phosphors from an interior of a lamp envelope, the interior of the envelope comprising a wall, a base layer adhered to the wall, and a coating layer comprising the rare-earth phosphors adhered to the base layer, the process comprising:

(A) flowing a gas through the envelope at a rate sufficient to remove particles of the coating layer but not the base layer; and (B) collecting the particles of the coating layer, the particles containing the rare-earth phosphors.

2. The process of claim 1 with the following additional steps subsequent to step (B):

(C) flowing another gas through the envelope at a rate sufficient to remove particles of the base layer; and (D) collecting the particles of the base layer.

3. The process of claim 1 wherein the envelope is glass.

4. The process of claim 1 wherein the coating layer is comprised of a system of rare-earth phosphors for use in a fluorescent lamp.

5. The process of claim 1 wherein the coating layer is derived from a suspension comprising a rare-earth phosphor system, a non-ionic surfacting agent and a thickening agent, wherein the suspension is 0.05 to 0.3 weight percent surfacting agent.

6. The process of claim 1 wherein the coating layer is derived from a suspension comprising a rare-earth phosphor system, a non-ionic surfacting agent and a thickening agent, wherein the suspension is 1 to 5 weight percent thickening agent.

7. The process of claim 1 wherein the coating layer is derived from a suspension comprising a rare-earth phosphor system, a non-ionic dispersing agent and a thickening agent, wherein the suspension is 0.1 to 3 weight percent dispersing agent.

8. The process of claim 1 wherein the coating layer is derived from a suspension comprising a rare-earth phosphor system, a non-ionic dispersing agent and a thickening agent, wherein the suspension is 1 to 5 weight percent thickening agent.

9. The process of claim 1 wherein the base layer is comprised of an alumina blend, the alumina blend having gamma alumina with a median particle size in the range of 30 to 100 nm and alpha alumina with a median particle size in the range of 500 to 1500 nm.

10. The process of claim 9 wherein the alumina blend is 5 to 80 weight percent gamma alumina and 20 to 95 weight percent alpha alumina.

11. The process of claim 1 wherein the base layer is comprised of an alumina blend, the alumina blend is 5 to 80 weight percent gamma alumina and 20 to 95 weight percent alpha alumina.

12. The process of claim 1 wherein the base layer is derived from a composition comprising a suspension comprising an alumina blend, a surfacting agent, dispersing agent and thickening agent, wherein the suspension is 0.01 to 5 weight percent surfacting agent.

13. The process of claim 1 wherein the base layer is derived from a composition comprising a suspension comprising an alumina blend, a surfacting agent, dispersing agent and thickening agent, wherein the suspension is 0.01 to 5 weight percent dispersing agent.

14. The process of claim 1 wherein the base layer is derived from a composition comprising a suspension comprising an alumina blend, a surfacting agent, dispersing agent and thickening agent, wherein the suspension is 0.05 to 20 weight percent thickening agent.

15. The process of claim 12, the alumina blend having gamma alumina with a median particle size in the range of 30 to 100 nm and alpha alumina with a median particle size in the range of 500 to 1500 nm.

16. The process of claim 13, the alumina blend having gamma alumina with a median particle size in the range of 30 to 100 nm and alpha alumina with a median particle size in the range of 500 to 1500 nm.

17. The process of claim 14, the alumina blend having gamma alumina with a median particle size in the range of 30 to 100 nm and alpha alumina with a median particle size in the range of 500 to 1500 nm.

18. The process of claim 1 wherein the gas in step (A) is comprised of compressed air.

19. The process of claim 2 wherein the gas in step (C) is comprised of compressed air.

20. The process of claim 1 wherein during step (A) the gas flows through the envelope at a rate of about 0.2 to about 10 liters per second.

21. The process of claim 1 wherein bases are connected to ends of the envelope and the process further comprises the step of removing at least the bases.

22. The process of claim 1 wherein the particles of the coating layer are collected using a cyclonic air/particle separator.

23. The process of claim 2 wherein the particles of the base layer are collected using a cyclonic air/particle separator.

* * * * *